Dec. 2, 1969  L. G. WARREN, JR  3,481,329
METHOD OF AND APPARATUS FOR DENTAL TREATMENT
Filed April 22, 1968  2 Sheets-Sheet 1
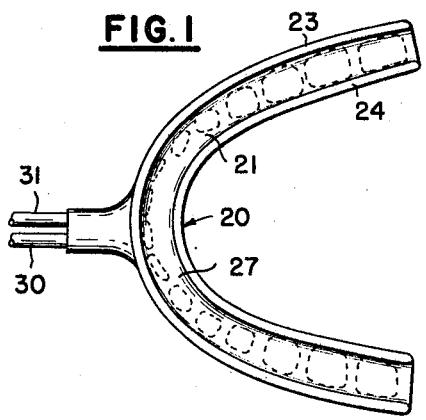
FIG. 1
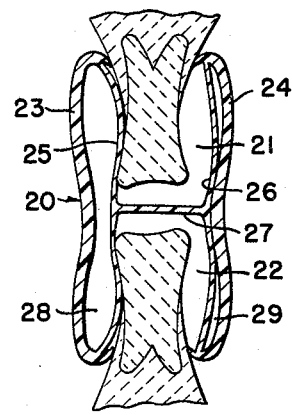
FIG. 4
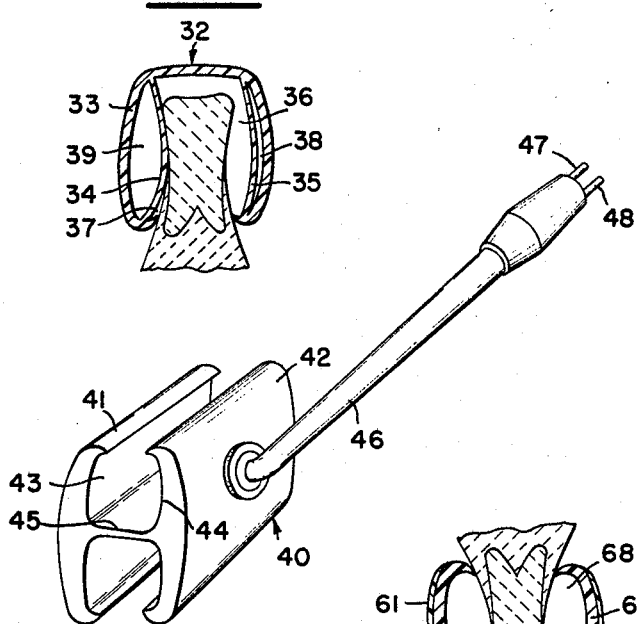
FIG. 2
FIG. 3
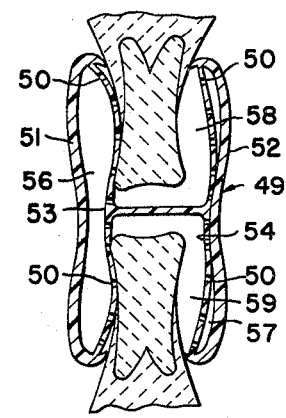
FIG. 5
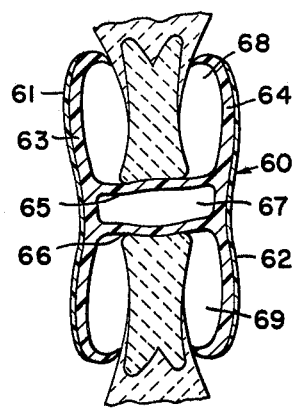
FIG. 6
INVENTOR.
LAMAR G. WARREN, JR.
BY Earnest Carl Edge Dec. 2, 1969     L. G. WARREN, JR     3,481,329
METHOD OF AND APPARATUS FOR DENTAL TREATMENT
Filed April 22, 1968     2 Sheets-Sheet 2
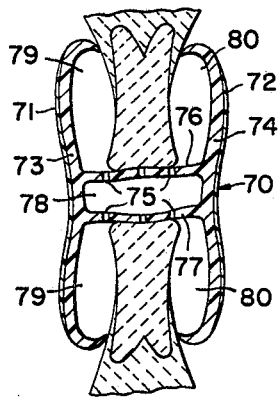
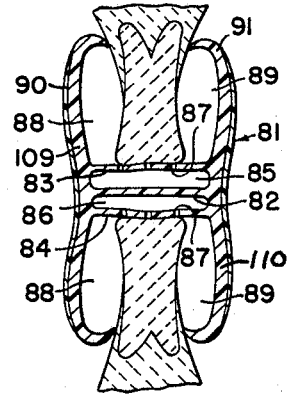
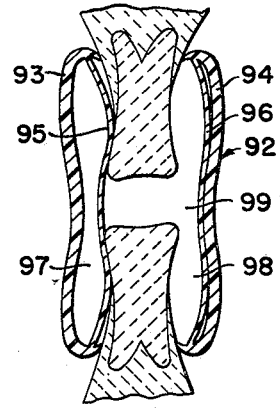
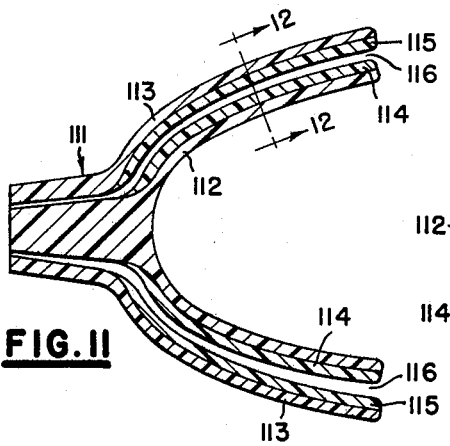
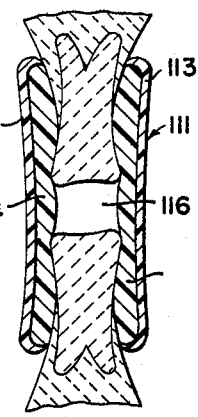
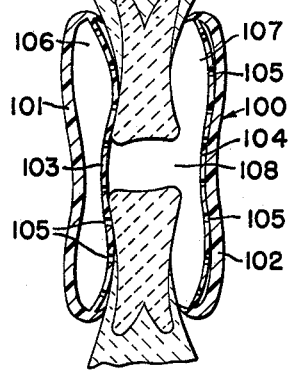
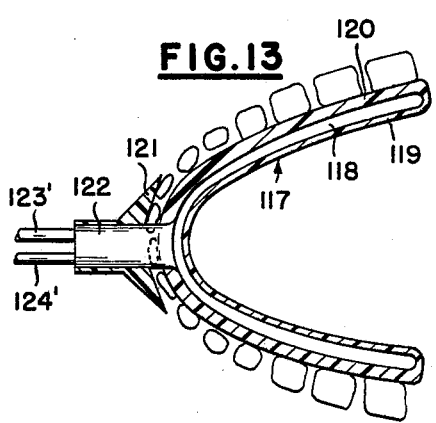
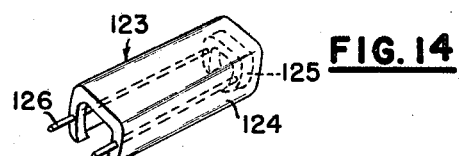
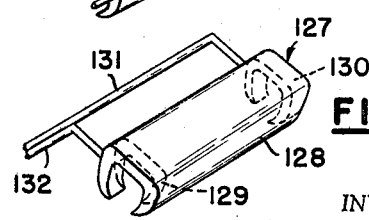
INVENTOR.
LAMAR G. WARREN, JR.
BY Ernest Carl Edge United States Patent Office 3,481,329
Patented Dec. 2, 1969

3,481,329
METHOD OF AND APPARATUS FOR DENTAL TREATMENT
Lamar G. Warren, Jr., 2181 NE. 27th Drive, Wilton
Manors, Fort Lauderdale, Fla. 33306
Continuation-in-part of application Ser. No. 454,348,
May 10, 1965. This application Apr. 22, 1968, Ser.
No. 722,942
Int. Cl. A61h 9/00, 13/00; A61c 17/00
U.S. Cl. 128—66                                    9 Claims

ABSTRACT OF THE DISCLOSURE

A device and method of treatment for dentition comprised of the steps of placing the teeth in a device having movable members which are capable of conforming generally to the shape of the dentition, introducing a cleaning or treating material into the device and in contact with the dentition, and providing movement for a portion of the device to cause the cleaning or treating material to move against the surface of the dentition.

CROSS-REFERENCE TO RELATED APPLICATIONS

This application is a continuation-in-part of my co-pending application, Ser. No. 454,348, filed May 10, 1965, now Patent No. 3,379,192, and my co-pending copending application Ser. No. 611,523, filed Dec. 29, 1966.

BACKGROUND OF THE INVENTION

Field of the invention

The invention relates in general to a method and apparatus for dental treatment and in more particularity to a method and apparatus whereby the teeth are placed into a member which generally conforms to the shape of the teeth, introducing a cleaning or treating material into the device in contact with the teeth and gums and then providing movement for the material against the surface of the teeth and gums.

Description of the prior art

The most common method of cleaning teeth today is to place a dentifrice on a toothbrush and rub the brush against the surface of the teeth and gums. In recent years the electric toothbrush has gained wide popularity but the method of operation is basically the same as the hand toothbrush.

In Shpuntoff Patent No. 3,261,354 there is disclosed a tooth cleaning tool which is comprised of a plurality of bristles, much like the common toothbrush, and which has a flexible member surrounding the bristles. The tool is guided over the teeth by contact with the flexible member which serves to guide the cleaning material, supplied through the handle of the tool, to the desired location.

To my knowledge there has never been a method of dental treatment in which the teeth are enclosed in an apparatus into which the treating material is introduced and which causes the material to be moved relative to teeth and gums by a force supplied by the enclosing apparatus.

SUMMARY OF THE INVENTION

It is the primary object of my invention to provide a method and apparatus for more effectively cleaning and/or treating the teeth and gums.

It is a further object of my invention to provide a method and apparatus whereby the teeth are placed into a treating device wherein the teeth and gums are contained a force is applied to the material to cause it to move relative to the teeth and gum surfaces.

Further features, objects, and advantages will either be specifically pointed out or become apparent when, for a better understanding of the invention, reference is made to the following written description taken in conjunction with the accompanying drawing.

BRIEF DESCRIPTION OF THE DRAWING

FIGURE 1 is a top plan view of one embodiment of my invention;
FIGURE 2 is a cross-section of another embodiment of my invention;
FIGURE 3 is a still further modification of my invention;
FIGURE 4 is a cross-sectional view of the embodiment shown in FIGURE 1;
FIGURE 5 is a cross-sectional view of a modification of the embodiment shown in FIGURE 4;
FIGURE 6 is a cross-sectional view of a further modification of the embodiment shown in FIGURE 4;
FIGURE 7 is a cross-sectional view of another modification;
FIGURE 8 is a cross-sectional view of a further modification;
FIGURES 9 and 10 are cross-sectional views of still further modifications;
FIGURE 11 is a cross-sectional view of a modification in which the two members move relative to each other;
FIGURE 12 is a cross-section of a modification of the embodiment shown in FIGURE 11;
FIGURE 13 is a further modification;
FIGURES 14 and 15 are modifications of the invention.

DESCRIPTION OF THE PREFERRED EMBODIMENTS

Several embodiments of the apparatus of my invention are shown in the drawing and described below and in each instance a dental treatment device is shown which is made to conform to the general contour of the dental arch or a portion of a dental arch. Illustrated in FIGURE 1 is a device which is made to cover both an upper and lower dental arch. FIGURE 2 is an embodiment which covers only the lower or upper portion of a dental arch, either completely or in part. FIGURE 3 is an embodiment which covers a portion of an upper and a portion of a lower dental device.

It is to be understood that any of the dental treatment devices shown and described can be made in any of the three forms shown in FIGURE 1 through 3 and still fall within the scope of my invention.

Referring now to FIGURES 1 and 4, a dental treatment device 20 is shown as having an upper cavity 21 and a lower cavity 22. The device itself is constructed of relatively hard outer walls 23 and 24 and flexible inner walls 25 and 26. The two walls 25 and 26 are connected by means of member 27 which separates the device into upper and lower cavities.

Walls 23 and 25 form a channel 28, common to both the upper and lower dental arches and walls 24 and 26 form a channel 29, also common to both the upper and lower dental arches.

Channel 28 is connected by means of tube 30 to a suitable source of fluid supply whereas channel 29 is connected to either the same source of fluid, or an entirely different source by means of tube 31.

Operation of this modification of my invention is as follows: A suitable dental cleaning or dental treatment material may be placed in the cavities 21 and 22 of device 20 or may be applied directly to the upper and lower dental arches. If a liquid is being used it may just be placed in the mouth. Once the mouthpiece 20 is placed in position as shown in FIGURE 4 the source of fluid pressure is activated in tube 30 and channel 28 expands so that wall 25 moves toward the teeth. The fluid pressure in line 30 or 31 is then activated to expand channel 29 and at the same time deflate the channel 28. With the fluid pressure being alternated between tubes 30 and 31 or being alternated in the individual tubes material within cavities 21 and 22 is pushed through and around the teeth and gums to contact every surface thereon.

The sources of fluid pressure may be ordinary pumps to pump air, water, or an other suitable fluid.

FIGURE 2 is a modification 32 used for by only one of the dental arches and is comprised of a relatively hard outer casing 33 with two flexible members 34 and 35. Walls 33 and 34 form a channel 39 therebetween with wall 34 providing a cavity 37 between it and the dentition. Walls 33 and 35 form a channel 38 therebetween with wall 35 providing a cavity 36 between it and the dentition.

Operation of the device 32 is the same as that described above in relation to device 20.

The cleaning and treatment device 40 shown in FIGURE 3 is comprised of hard outer members 41 and 42 with flexible inner members 43 and 44 joined by connecting member 45. Casing 42 is provided with a swivel handle 46 through which fluid pressure tubes 47 and 48 extend.

In FIGURE 5 device 49 is shown as being comprised of outer relatively hard members 51 and 52 and inner flexible members 53 and 54 joined together by means of member 55. Each of members 53 and 54 have a plurality of openings 50 therein.

Walls 51 and 53 form a channel 56 therebetween while walls 52 and 54 form a channel 57 therebetween. The inner walls form a cavity 58 into which the upper teeth fit and a cavity 59 into which the lower teeth fit.

Operation of this modification is similar to that described above in relation to FIGURES 1 and 4 with the further characteristic of permitting the pumped fluid to escape from each of the channels 56 and 57 to the cavities 58 and 59 into contact with the teeth and gums. With a device of this type a dental cleaning and/or treatment material may or may not be placed in the cavities 58 and 59 or on the teeth themselves.

Attention is called to the fact that in each of the modifications described above the alternating pumping of fluid into the two cavities imparts a predominantly horizontal or lateral motion to the treatment material. The modification 60 shown in FIGURE 6 is designed to create a predominantly vertical movement.

In this modification relatively hard outer casing members 61 and 62 are each provided with a relatively soft inner liner 63 and 64. Flexible members 65 and 66 extend between members 63 and 64 and are spaced to provide a channel 67. Cavity 68 is formed to accommodate the upper teeth while cavity 69 accommodates the lower teeth.

In operation, as fluid is pumped into channel 67 it expands both upwardly and downwardly and forces the dental treatment material in a substantially vertical path to contact all the surfaces of the teeth.

The modification 70 shown in FIGURE 7 is comprised of relatively hard outer members 71 and 72 and a relatively soft inner liner 73 and 74. Flexible members 76 and 77 extend between members 73 and 74 ann are each provided with openings 75 therein for the escape of fluid from channel 78.

In operation of this modification the change of fluid pressure within channel 78 causes members 76 and 77 to move relative to each other which gives a vertical direction of motion to the cleaning and treating material within cavities 79 and 80.

The device 81 shown in FIGURE 8 is similar to the one shown in FIGURE 7 except that a rigid member 82 is provided to separate the channel formed between flexible members 83 and 84 into two channels 85 and 86. Each of members 83 and 84 has a plurality of openings 87 therein for the escape of fluid from channels 85 and 86.

Cavities 88 and 89 are formed by relatively hard outer members 90 and 91 and relatively soft inner members 109 and 110.

In operation of this modification channel 85 supplies fluid pressure to move the cleaning material in an upward vertical direction while channel 86 supplies fluid pressure to move the cleaning material in a downward vertical direction.

FIGURES 9 and 10 each illustrate modifications in which no connecting member is used between the two flexible members. In FIGURE 9 dental treatment device 92 is shown as having relatively hard outer walls 93 and 94 with inner flexible members 95 and 96 forming channels 97 and 98. The dentition is within cavity 99 formed by the walls 95 and 96.

In the modification 100 shown in FIGURE 10 the outer walls 101 and 102 compare to the outer walls of device 92 and the inner walls 103 and 104 compare to the inner walls of device 92. Walls 103 and 104, however, each have a plurality of openings 105 therein for the passage of fluid from channels 106 and 107 to cavity 108.

FIGURES 11 and 12 illustrate a modification of the invention in which the device 111 has no hollowed out portions but relies on the movement of members 112 and 113 relative to each other to move the cleaning material. Members 112 and 113 are relatively rigid members with a lining 114 and 115 respectively of a relatively soft material.

As can be seen in FIGURE 11 members 112 and 113 may be moved relative to each other by means of a mechanical, hydraulic, or any suitable force and in so doing the softer linings 114 and 115 move the cleaning or treating material within cavity 116 against the surfaces of the teeth.

FIGURE 13 illustrates a modification 117 in which a hollowed outer portion 118 is provided within relatively rigid member 119. Along the outer side of hollowed out portion 118 is a layer 120 of soft material which can be moved toward and away from the surfaces of the teeth if desired.

Clamp member 121 fits over stem 122 of device 117 to hold the device in position within the mouth. Tubes 123' and 124' are provided to be connected to a suitable source of fluid supply. Hollowed out portion 118 may be provided with a plurality of openings if desired to permit fluid to flow through layer 120 toward the dentition.

In the embodiment of my invention described above the cleaning or treating material is moved in some instances in either a horizontal or lateral direction to the dention and in other instances in a vertical direction. FIGURES 14 and 15 each illustrate a modification in which the movement is in a direction substantially parallel to the alignment of the dentition.

FIGURE 14 shows a device 123 having a casing 124 within which is a piston 125 made of semi-rigid material. Actuators 126 are connected to the piston 125 and may be attached to any suitable means for providing movement thereto. As the U-shaped piston 125 is moved back and forth within the casing the cleaning material moves longitudinally with respect to the alignment of the teeth.

In the device 127 shown in FIGURE 5 a casing 128 has an expandable chamber 129 at one end and a second expandable chamber 130 at the opposite end. The two chambers are connected to a fluid supply by means of lines 132 and 131 respectively. When the chambers 129 and 130 are inflated and deflated by means of fluid pressure the flow of the treating material will be in a direction longitudinal to the alignment of the dentition.

I claim:
1. The method of dental treatment which comprises the steps of:
   (a) placing the teeth in a member which fits over at least a portion of the dentition, said member having portions spaced apart to embrace the dentition with at least one part of said member being hollow and having a wall facing said space which is movable relative to another part of said member,
   (b) introducing a treating material into contract with the dentition in a manner such that said material is in said space between said portions when said member is in place, and
   (c) producing repeatedly varying pressure in said hollow part by introducing fluid into and withdrawing fluid from said hollow part of the member to repeatedly move said movable wall and thus cause the treating material to move relative to the surfaces of the dentition.

2. A method of dental treatment according to claim 1 with the added step of:
   (d) causing the treating material to move in a substantially horizontal direction.

3. A method of dental treatment according to claim 1 with the added step of:
   (d) causing the treating material to move in a direction substantially parallel to the alignment of the dentition being treated.

4. A method of dental treatment according to claim 1 with the added step of:
   (d) causing the treating material to move in a substantially vertical direction.

5. A method of dental treatment according to claim 1 with the added step of:
   (d) introducing at least a portion of the treating material through the member in which the teeth are placed.

6. A dental treatment device comprising:
   (a) a member shaped to fit over at least a portion of the dentition, said member having dentition-receiving portions spaced apart so as to embrace the dentition with at least one part of said member being hollow and having a wall movable relative to another part of said member,
   (b) at least said wall of said member being movable relative to the dentition and relative to other walls of said member, and
   (c) at least one tube means communicating with said hollow part for repeatedly varying fluid pressure to move said movable wall and thereby move a treating material relative to the surfaces of the dentition.

7. A dental treatment device according to claim 6 in which said portions define a channel.

8. A dental treatment device according to claim 7 with said hollowed out part being in communication with said channel.

9. A dental treatment device according to claim 7 with said hollowed out part being closed from communication with said channel.

References Cited

UNITED STATES PATENTS

| | | | |
|---|---|---|---|
| 1,500,107 | 7/1924 | Chandler | 128—239 |
| 1,586,262 | 5/1926 | Noble | 401—10 |
| 1,736,996 | 11/1929 | Dalmas | 15—167 |
| 3,087,183 | 4/1963 | Semon | 15—167 XR |

L. W. TRAPP, Primary Examiner

U.S. Cl. X.R.

128—239